United States Patent
Vazzana et al.

(10) Patent No.: US 9,644,779 B2
(45) Date of Patent: May 9, 2017

(54) GATE VALVES FOR INSTALLATION IN PRESSURIZED PIPES

(71) Applicant: ADS LLC, Huntsville, AL (US)

(72) Inventors: Christopher C. Vazzana, Chicago, IL (US); Carl Mastny, Crete, IL (US); Stephen Roehrig, Plainfield, IL (US); Panagiotis Tsafaras, Elmwood Park, IL (US)

(73) Assignee: Hydra-Stop LLC, Burr Ridge, IL (US)

( * ) Notice: Subject to any disclaimer, the term of this patent is extended or adjusted under 35 U.S.C. 154(b) by 185 days.

(21) Appl. No.: 14/586,469

(22) Filed: Dec. 30, 2014

(65) Prior Publication Data

US 2015/0247578 A1 Sep. 3, 2015

Related U.S. Application Data

(60) Provisional application No. 61/946,416, filed on Feb. 28, 2014.

(51) Int. Cl.
| | |
|---|---|
| *F16L 55/11* | (2006.01) |
| *F16L 55/10* | (2006.01) |
| *F16L 55/105* | (2006.01) |

(52) U.S. Cl.
CPC ............. *F16L 55/11* (2013.01); *F16L 55/105* (2013.01); *Y10T 137/613* (2015.04)

(58) Field of Classification Search
CPC ......... F16L 55/11; F16L 55/105; F16L 41/04; F16L 41/06; Y10T 137/613; F16K 3/00

USPC .......... 137/15.23, 315.39–315.31, 317–318; 251/326

See application file for complete search history.

(56) References Cited

U.S. PATENT DOCUMENTS

| | | | | |
|---|---|---|---|---|
| 5,186,199 A | * | 2/1993 | Murphy | ..... F16K 7/20 137/15.08 |
| 6,810,903 B1 | * | 11/2004 | Murphy | ..... F16L 55/105 137/315.41 |
| 8,627,843 B2 | | 1/2014 | Ries | |
| 2006/0070659 A1 | * | 4/2006 | Nelson | ..... F16K 3/28 137/318 |
| 2009/0224197 A1 | * | 9/2009 | Nakano | ..... F16K 3/186 251/326 |

(Continued)

*Primary Examiner* — Marina Tietjen
(74) *Attorney, Agent, or Firm* — Miller, Matthias & Hull LLP (57) ABSTRACT

A gate valve assembly is disclosed that may be installed in a pressurized pipe or conduit. The gate valve assembly includes a nozzle that is connected perpendicularly to the pipe. The nozzle includes a distal end, a proximal end and a through passage extending therebetween. The through passage includes a proximal portion with a circular cross-sectional profile for sealingly engaging a wiper seal disposed on a valve cartridge. The passage also includes a distal portion with a non-circular cross-sectional profile that complements a non-circular cross-sectional profile of the cartridge. The non-circular cross-sectional profiles of the cartridge and passage prevent the cartridge from twisting or rotating within the nozzle or pipe. The proximal end of the nozzle also features an inner lip, which facilitates the welding of the proximal end of the nozzle to an upper saddle member, which is used to clamp the nozzle to the pipe prior to cutting or pressure tapping of the pipe.

15 Claims, 7 Drawing Sheets

(56) References Cited

U.S. PATENT DOCUMENTS

2010/0243072 A1* 9/2010 McGraw ................ E21B 29/12
137/15.13

* cited by examiner

GATE VALVES FOR INSTALLATION IN PRESSURIZED PIPES

BACKGROUND

Technical Field

This disclosure relates generally to valves for shutting off flow in a pressurized pipe or conduit. More specifically, this disclosure relates to valves that are installable in a pressurized pipe without shutting off flow to the pipe during installation. Still more specifically, this disclosure relates to improvements in the designs of gate valves, which increase the pressure rating of the valves.

Description of the Related Art

Pressurized conduits or pipes convey fluids, both liquid and gas, in municipalities, industrial plants and commercial installations. When originally installed, a network of pipes may include block valves used to isolate certain sections of the pipe for repairs, relocation or installation of new components into the pipe. When a shutdown is required in a municipal water system, a large area may be deprived of water service. Accordingly, in addition to the inconvenience to residents, schools, hospitals, commercial and/or industrial facilities may have to be shut down until water service is restored.

The length of pipe that needs to be isolated can be shortened and fewer people inconvenienced by adding additional valves, in conjunction with the preexisting block valves. The additional valves may be of the form that can be installed in a pressurized pipe without service interruption and with minimal fluid loss. If such a valve is installed, upon closure of the added valve and completion of the work on the depressurized damaged section of the pipe, the additional valve may be opened or retracted and the block valves are opened, thereby restoring flow through the repaired section of pipe. The additional valves are known in the art under a variety of names, such as inserting valves, add-on valves, insertable gate valves, etc. Examples can be found in the commonly assigned U.S. Pat. Nos. 6,810,903 and 8,627,843.

Typically, such valves include a housing clamped to and communicating with the pressurized conduit that is known in the art as a nozzle or a nozzle assembly. In most cases, the nozzle includes a cylindrical housing section that is clamped perpendicular and pressure-tight to the outside of the pipe by a saddle assembly as shown in FIG. 27 of the '903 patent. Communication between the nozzle and pipe is established by a process called pressure tapping, hot tapping or underpressure tapping. This process is well known in prior art, and utilizes a temporary valve, such as a knife valve, to allow a cutting device and a new valve to be mounted to the pipe without significant loss of fluid pressure or fluid flow. Specifically, after the pipe is cut, the additional valve can be passed through the temporary knife valve into the nozzle, where it may be held until the pipe needs to be closed. To stop flow, the valve body is moved from the nozzle into the pipe.

Some valves added to municipal pipe systems are intended for temporary service, often in emergencies, while other valves are designed for permanent installation into a pressurized pipe. Each permanent valve is provided with an internal jackscrew-type actuator that allows the valve to be operated as a conventional block valve that is opened and closed by a worker by merely turning a handle or a wrench. This type of permanent valve can be used in emergencies in the same manner as a temporary valve and then abandoned.

The current method of manufacturing of these valves is very labor intensive and has large amounts of machining and welding. Referring to FIG. 1 of the '903 patent, before use, the upper end of the nozzle 46 must be welded to the flange that connects the nozzle 46 to the temporary knife valve 38. Further, the lower end of the nozzle 46 must be welded to the upper saddle member 52 after an opening is plasma cut in the upper saddle member 52. Welding the lower end of the nozzle 46 to the upper saddle member 52 is difficult as the welding material is prone to seeping between the lower end of the nozzle 46 and the upper saddle member 52. Further, pipes having a common internal diameter (ID), e.g., eight inches, may have varying outer diameters (ODs), depending on the thickness of the pipe 32, the material used to fabricate the pipe 32, the pressure rating of the pipe 32 and the end use. To control costs, the size of the nozzle 46 is varied for each pipe ID, not each pipe OD, while the size of the upper and lower saddle members 52, 50 must varied for each pipe OD to ensure a pressure tight connection between the upper saddle member 52 and the pipe 32. As a result, the lower end of the nozzle 46 may not have a diameter that matches that of the upper saddle member 52, which exacerbates the problem of welding material seeping between the lower end of the nozzle 46 and the upper saddle member 52.

Other problems associated with the valve assemblies illustrated in the '903 and '843 patents include difficulties associated with installing the valves below ground level because the nozzles 46 are not equipped with a structure that can be used to tether the nozzle 46 to a winch. Further, currently employed gate valves, like the one shown at 44 in FIG. 1 of the '903 patent, typically include a paddle or gate 180 coupled to a housing structure known as a bullet or a cartridge that protects the paddle 180 as the cartridge and the paddle 180 are lowered through the nozzle 46 and into the pipe 32. The cartridge needs to be equipped with an upper circumferential seal (not shown) that prevents fluid from entering the nozzle 46 after the gate valve 44 is installed. The upper seal may be ring-shaped or it may embody the shape of the lower end of the nozzle 46, which has been cut to fit on the hole cut on top of the cylindrical pipe 32. Either way, the upper seal is prone to failure as it is exposed to substantial wear and tear as the cartridge and paddle 180 pass through the lower end of the nozzle 46 and through the hole cut into the pipe 32 as the gate valve 44 is opened and closed.

Another problem associated with such gate valves is the proper alignment of the gate valve 44 in the nozzle 46. Specifically, the paddle 180 must be lined up perpendicular to the axis of the pipe 32 or the flow through the pipe 32. To accomplish this, a pair of keys (not shown) is provided on the cartridge, which must be lined up with slots (not shown) that are manually cut in the inner surface of the nozzle 46. Over time, the keys may corrode and tend to stick in the slots, which may also be subject to corrosion. Not only does this system not work very well for larger, heavier valves, it requires a time consuming and costly manufacturing process.

Accordingly, improved gate valve assemblies that may be installed in pressurized pipes and conduits are needed.

SUMMARY OF THE DISCLOSURE

In one aspect, this application discloses a gate valve assembly for perpendicular mounting to a cylindrical pipe. The disclosed gate valve assembly may include a nozzle that includes an open distal end and an open proximal end with a through passage extending from the distal to the proximal end. The proximal end may be perpendicularly connected to an upper saddle member. The upper saddle member may be coupled to a lower saddle member for clamping the cylindrical pipe therebetween. The nozzle or passage may further include a distal portion having a first non-circular cross-sectional profile and a proximal portion having a first circular cross-sectional profile. The gate valve assembly may also include a gate valve that includes a cartridge and a paddle. The cartridge may include a distal section connected to a proximal section. The distal section of the cartridge may have a second non-circular cross-sectional profile that is mateably received in the first non-circular cross-sectional profile of the passage. The proximan section of the cartridge may have a second circular cross-sectional profile that is mateably received in the first circular cross-sectional profile. The proximal section of the cartridge may further include a rounded proximal end. The first and second non-circular cross-sectional profiles permit vertical movement of the cartridge along the passage of the nozzle and prevent rotational movement of the cartridge within the nozzle. The proximal section of the cartridge may include a paddle recess that extends along diametrically opposite portions of the proximal section and diametrically across the rounded proximal end of the cartridge. The paddle recess may accommodate the paddle. The first and second non-circular cross-sectional profiles may be configured to orient the paddle and the paddle recess in a perpendicular relationship to the cylindrical pipe.

In another aspect, this application discloses another gate valve assembly for perpendicular mounting to a cylindrical pipe. The gate valve assembly may include a nozzle with an open distal end, an open proximal end and a through passage extending from the distal end to the proximal end. The proximal end may be perpendicularly connected to an upper saddle member. The upper saddle member may be coupled to a lower saddle member for clamping the cylindrical pipe therebetween. The gate valve assembly may include a gate valve that may include a cartridge and a paddle. The gate valve may be accommodated in the through passage. The open proximal end of the nozzle may include a continuous edge welded to the upper saddle member. The continuous edge may be connected to an inner lip that is flush with an inner surface of the proximal section of the nozzle. The inner lip may extend proximally outward from the continuous edge.

In yet another aspect, this application discloses yet another gate valve assembly for perpendicular mounting to a cylindrical pipe. The gate valve assembly may include a nozzle that includes an open distal end, an open proximal end and a through passage extending from the distal end to the proximal end. The proximal end may be perpendicularly connected to an upper saddle member. The upper saddle member may be coupled to a lower saddle member for clamping the cylindrical pipe therebetween. The passage may further include a distal portion having a first polygonal cross-section profile. The passage may also include a proximal portion having a first circular cross-sectional profile. The gate valve assembly may further include a gate valve comprising a cartridge and a paddle. The cartridge may include a distal section connected to a proximal section. The distal section of the cartridge may have a second polygonal cross-sectional profile that is mateably received in the first polygonal cross-sectional profile of the passage. At least part of the proximal section of the cartridge may have a second circular cross-sectional profile that is mateably received in the first circular cross-sectional profile of the passage. The proximal section of the cartridge may further include a rounded proximal end. The proximal section of the cartridge may include a paddle recess that accommodates a paddle.

The first and second polygonal profiles may be configured so that the paddle recess and the paddle are oriented perpendicular to the cylindrical pipe.

In any one or more of the embodiments described above, the first and second non-circular cross-sectional profiles may each include a truncated apex that is oriented perpendicular to the cylindrical pipe.

In any one or more embodiments described above, the first and second non-circular cross-sectional profiles may each include a plurality of apexes and a truncated apex. The truncated apexes are generally perpendicular to cylindrical pipe.

In any one or more of the embodiments described above, the paddle may further include an outer edge that extends beyond the proximal section of the cartridge and the paddle may further include opposite sides disposed primarily within the paddle recess. The truncated apexes of the first and second non-circular cross-sectional profiles may be generally parallel to the opposite sides of the paddle.

In any one or more of the embodiments described above, the upper saddle member extends along a first saddle axis that may be generally perpendicular to the truncated apexes.

In any one or more of the embodiments described above, the proximal section of the cartridge may include a wiper seal recess that encircles the proximal section of the cartridge between the distal section and the rounded proximal end. The wiper seal recess may accommodate a circular wiper seal. The circular wiper seal may sealably engage the first circular cross-sectional profile of the proximal portion of the passage.

In any one or more of the embodiments described above, the distal end of the nozzle may be connected to a flange and the flange may be connected to at least one clevis.

In any one or more of the embodiments described above, the open proximal end of the nozzle may include a continuous edge welded to the upper saddle member. The continuous edge may be connected to an inner lip that may be flush with an inner surface of the proximal section of the nozzle. The inner lip may extend proximally outward from the continuous edge.

In any one or more of the embodiments described above, the paddle recess and the paddle are generally U-Shaped.

Other advantages and features will be apparent from the following detailed description when read in conjunction with the attached drawings.

BRIEF DESCRIPTION OF THE DRAWINGS

For a more complete understanding of the disclosed methods and apparatuses, reference should not be made to the embodiments illustrated in greater detail in the accompanying drawings, wherein.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments herein.

DETAILED DESCRIPTION OF THE PRESENTLY PREFERRED EMBODIMENTS

Figure 1:
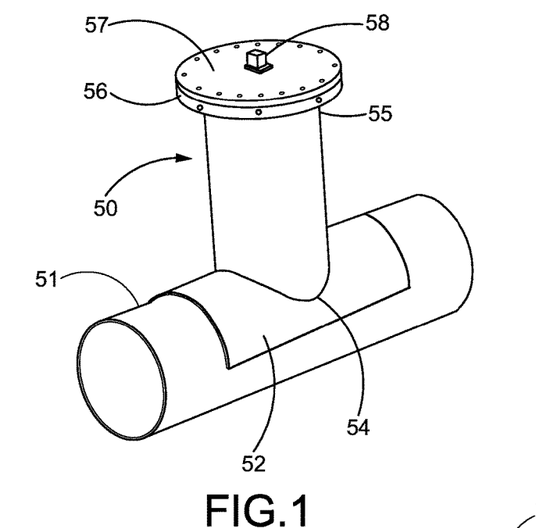
FIG. 1 is a perspective view of a disclosed nozzle installed on a section of cylindrical pipe.

FIG. 1 is a perspective view of a nozzle 50 mounted to a section of a pipe 51 that may be a pressurized pipe or conduit such as a municipal water main. Other applications for installing a valve in a pressurized pipe or conduit will be apparent to those skilled in the art and this disclosure in no way is limited to municipal water applications. Those skilled in the art will be aware of other industrial and commercial needs for installing a valve in a pressurized pipe or conduit without depressurizing the pipe or conduit.

Still referring to FIG. 1, the nozzle 50 is welded to an upper saddle member 52 after cutting a hole in the upper saddle member 52, preferably using a plasma process. The upper saddle member 52 is welded to the proximal end 54 of the nozzle 50 while a distal end 55 of the nozzle 50 is connected to a flange 56, which, in turn, may be coupled to a cover plate 57. An operating nut 58 is also shown on top of the cover plate 57. The operating nut 58 may be coupled to an actuator or, more precisely, a feed screw that is used for raising and lowering the gate valve as described below. In FIGS. 1-7, the lower saddle member 86 is not shown (see FIGS. 8-10).

Figure 2:
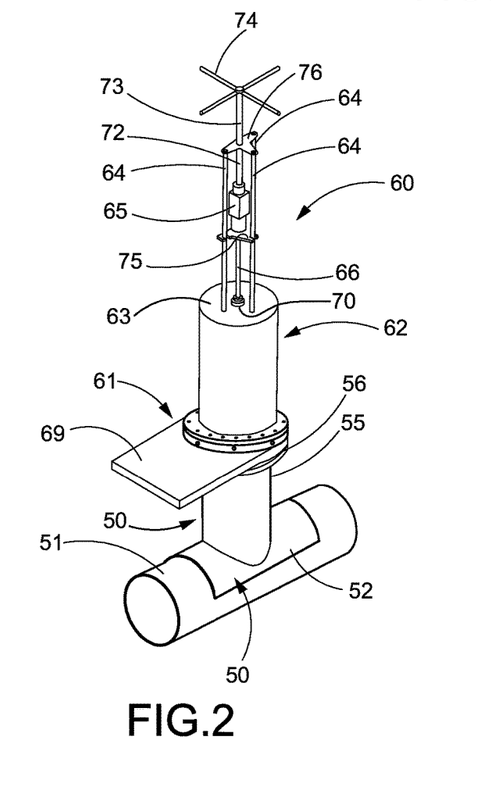
FIG. 2 is a perspective view of the nozzle and cylindrical pipe shown in FIG. 1 during the installation process and further illustrating a temporary knife valve disposed between the nozzle and an installation housing.
Figure 3:
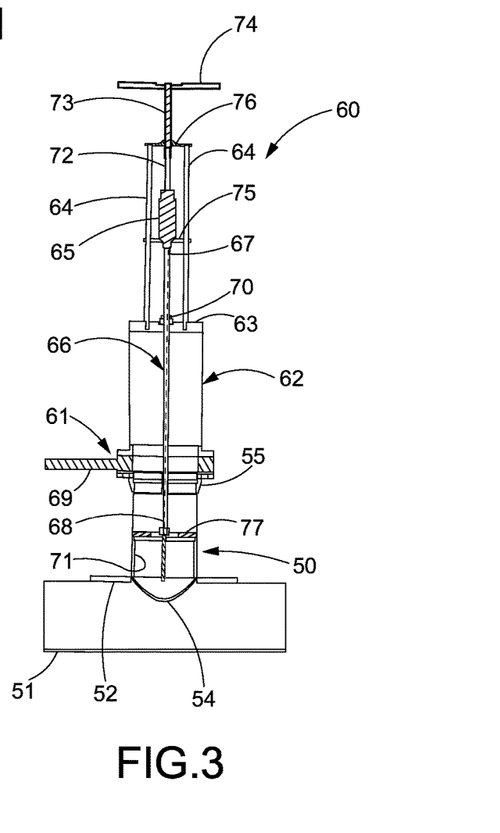
FIG. 3 is a sectional view of the assembly shown in FIG. 2, particularly illustrating the temporary knife valve in an open position with a cylindrical cutting device disposed in the nozzle and ready to cut a hole in the pipe.

Turning to FIGS. 2-3, an installation assembly 60 is disclosed. To install a gate valve 82 (see FIGS. 6-7) in a pressurized pipe 51 without depressurizing the pipe 51, the nozzle 50 is installed on the pipe 51 after welding the nozzle 50 to the upper saddle member 52 and then placing the upper saddle member 52 on the pipe 51. The upper saddle member 52 and lower saddle member 86 (see FIGS. 8-10) are clamped to the pipe 51 with straps, clamps or other devices to secure a tight fit and at least a partial seal between the upper saddle member 52 and the pipe 51. Then, with the cover plate 57 removed, a temporary valve 61 may be mounted on the flange 56 of the nozzle 50. In the embodiment shown, the temporary valve 61 is a knife valve that features a slidable plate 69 that may be moved to the right in FIG. 3 to block any flow from the nozzle 50 to the installation housing 62.

The installation housing 62 may be mounted on top of the temporary valve 61 as shown in FIGS. 2-3. The installation housing 62 may include a cover 63 that contains any fluid within the installation housing 62 as described below. In FIGS. 2-3, the installation assembly 60 is being readied to cut a hole in the pipe 51 through the hole previously cut in the upper saddle member 52. A plurality of guideposts 64 are mounted on top of the cover 63. The guideposts 64 prevent rotational movement of the actuator 65, which may be a motor, such as an air motor, electric motor, hydraulic motor, etc. Other types of actuators 65 will be apparent to those skilled in the art. The actuator 65 may be coupled to a mandrel or shaft 66 having a distal end 67 coupled to the actuator 65 and a proximal end 68 coupled to a cylindrical cutting device 71. Using the actuator 65, the shaft 66 is rotated thereby rotating the cylindrical cutting device 71 to penetrate and cut a hole in the pipe 51 as shown in FIGS. 4-5.

Still referring to FIG. 3, one or more shafts or extensions 72, 73 may be used to connect the actuator 65 to a handle 74. The actuator 65 may also be equipped with a plate 75 that engages the guideposts 64 to prevent rotation of the actuator 65. Further, a packing nut 70 may be used to seal a central opening in the cover 63 to prevent leakage. An additional combination plate/nut 76 may be used to stabilize the guideposts 64 as well as the extension shafts 72, 73. Further, the cylindrical cutting device 71 may be coupled to a centering ring 77 to ensure that the cut made by the cylindrical cutting device 71 is in alignment with the inside diameter of the nozzle 50 and as illustrated in FIG. 4.

Figure 4:
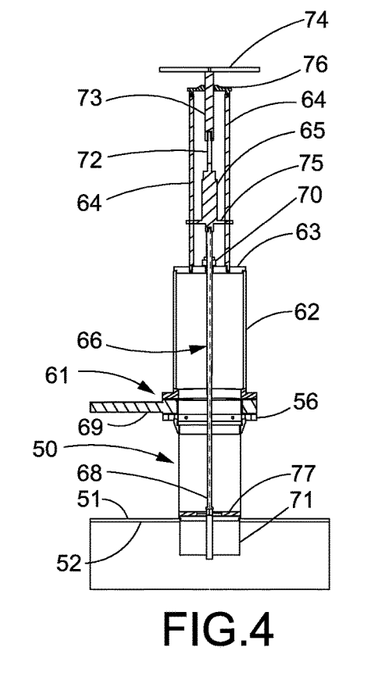
FIG. 4 is another illustration of the assembly shown in FIGS. 2-3, with the cylindrical cutting device having cut the pipe or, in other words, illustrating a completion of the pressure tapping.
Figure 5:
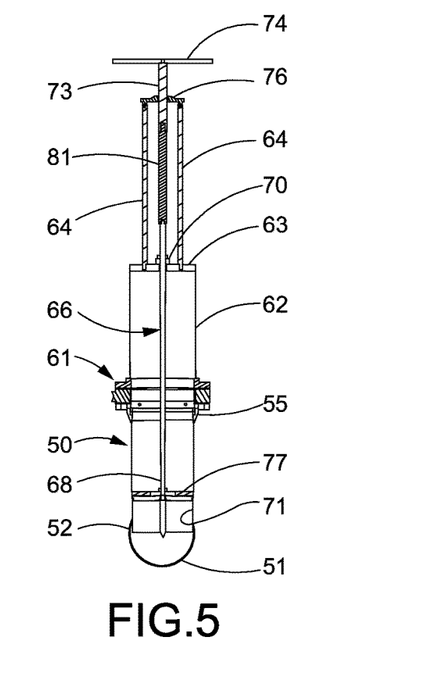
FIG. 5 is an end sectional view of the assembly shown in FIG. 4 after the pressure tapping has been completed and after removal of the actuator. In the position shown in FIGS. 4-5, the cylindrical cutting device is ready to be drawn upwards through the temporary valve and into the installation housing.

In FIGS. 4-5, the pressure tapping operation has been completed as the cylindrical cutting device 71 has cut through the pipe 51. In FIG. 5, the actuator 65 has been removed and a longer extension shaft 81 has been inserted between the shafts 66, 73. At this point, the cylindrical cutting device 71 may be pulled upward through the temporary valve 61 and into the installation housing 62. The temporary valve 61 may then be closed or the plate 69 moved to the right in FIG. 4 to isolate the cylindrical cutting device 71 in the installation housing 62 thereby exposing just the nozzle 50 to the pressure flowing through the pipe 51.

Figure 6:
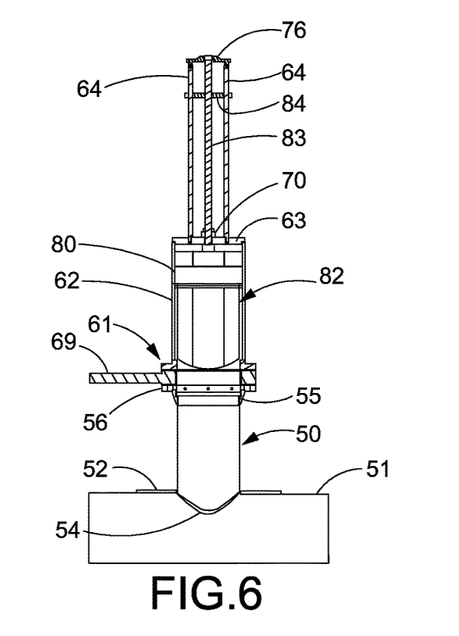
FIG. 6 illustrates the installation assembly after the cylindrical cutting device and actuator have been removed and a gate valve has been installed in the installation housing.
Figure 7:
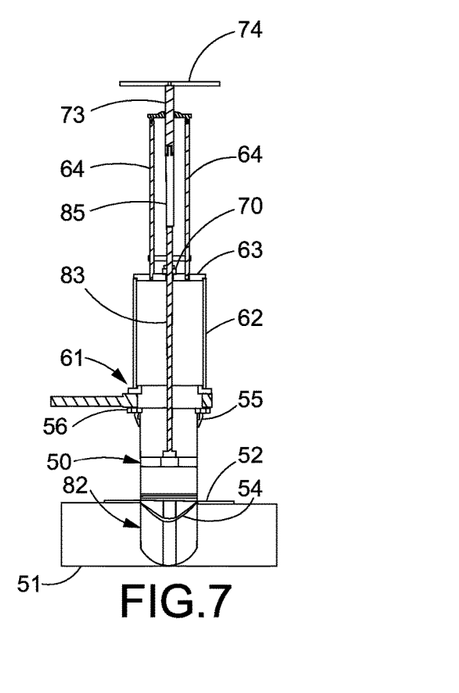
FIG. 7 is another sectional view of the assembly as shown in FIG. 6 with the gate valve having been moved from the installation housing, through the temporary valve and into the nozzle that is disposed above the cut section of the cylindrical pipe. In the position shown in FIG. 7, the temporary valve and the installation housing may be removed and a top plate may be installed on the distal end of the nozzle and the gate valve may be moved between the closed position shown in FIG. 7 and the open position shown in FIG. 8.

With the temporary valve 61 in a closed position, the installation housing 62 and cutting device 71 may be safely removed and the cylindrical cutting device 71 and associated shafts 66, 81, 73 and handle 74 may be replaced with the gate valve 82 which is coupled to a shaft 83 as shown in FIG. 6. The shaft 83 passes through the guide plate 84, the packing nut 70 and the cover 63 of the installation housing 62. In FIG. 6, the temporary valve 61 is shown in an open position thereby enabling the gate valve 82 to be moved from the position shown in FIG. 6 to the position shown in FIG. 7 where the gate valve 82 is sealably inserted through the nozzle 50 and into the pipe 51.

Figure 8:
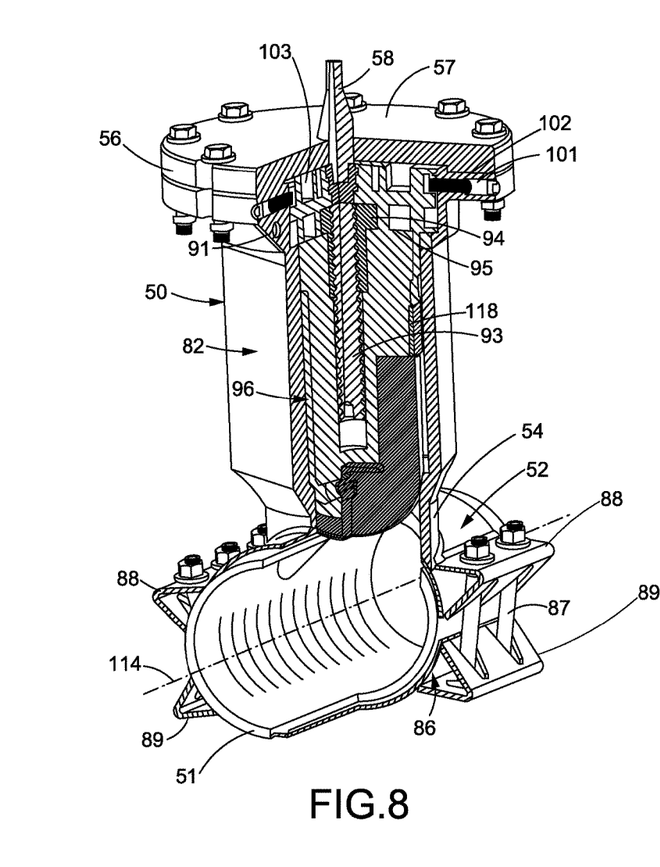
FIG. 8 is a sectional and perspective view of an installed gate valve assembly made in accordance with this disclosure, and with the gate valve in an open position.
Figure 9:
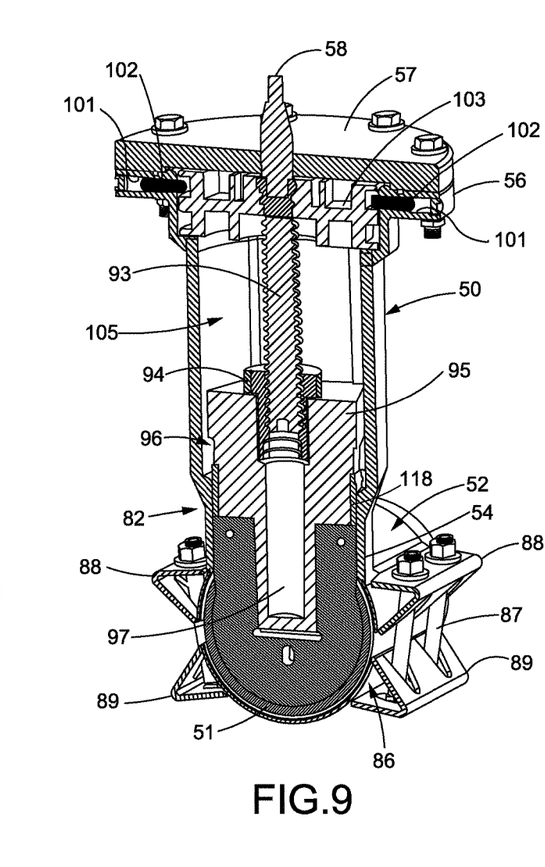
FIG. 9 is a sectional and perspective view of an installed gate valve assembly, shown in a closed position.
Figures 10, 11:
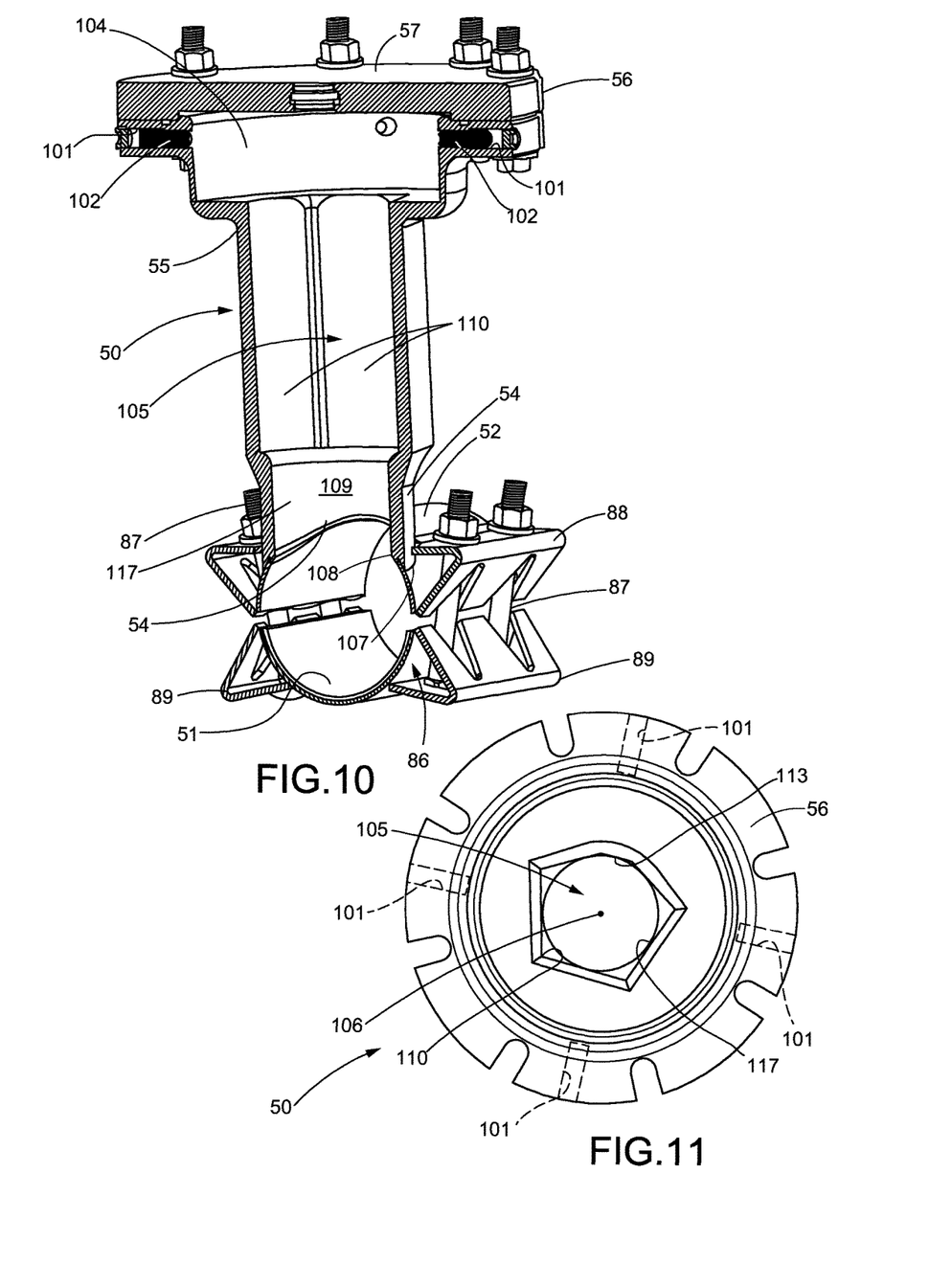
FIG. 10 is a sectional and perspective view of a disclosed nozzle welded to an upper saddle member and secured to a cut section of pipe with upper and lower saddle members.
FIG. 11 is a top plan view of the nozzle shown in FIG. 10.

As shown in FIGS. 8-10, the upper saddle member 52 may be coupled to the lower saddle member 86 using the plurality of clamping bolts 87, which extend between the brackets 88 of the upper saddle member 52 and the brackets 89 of the lower saddle member 86. The nozzle 50 may be cast which avoids having to weld the flange 56 to the nozzle 50 and which enables one or more clevises 91 to be included in the flange 56/nozzle 50 structure without additional welding. Casting the nozzle 50/flange 56/clevis 91 also enables the proximal end 54 of the nozzle 50 to be equipped with an inner lip 108 that protrudes proximally from the proximal edge 107 of the proximal end 54 of the nozzle 50 as shown in FIGS. 10 and 12-13.

The operating nut 58 may be coupled to a feed screw 93. The feed screw 93 may pass through a stem nut 94, which is mounted in the distal section 95 of the cartridge 96. The cartridge 96 may also include a proximal section 97, the details of which will be discussed in detail below in connection with FIGS. 14-19.

Figure 12:
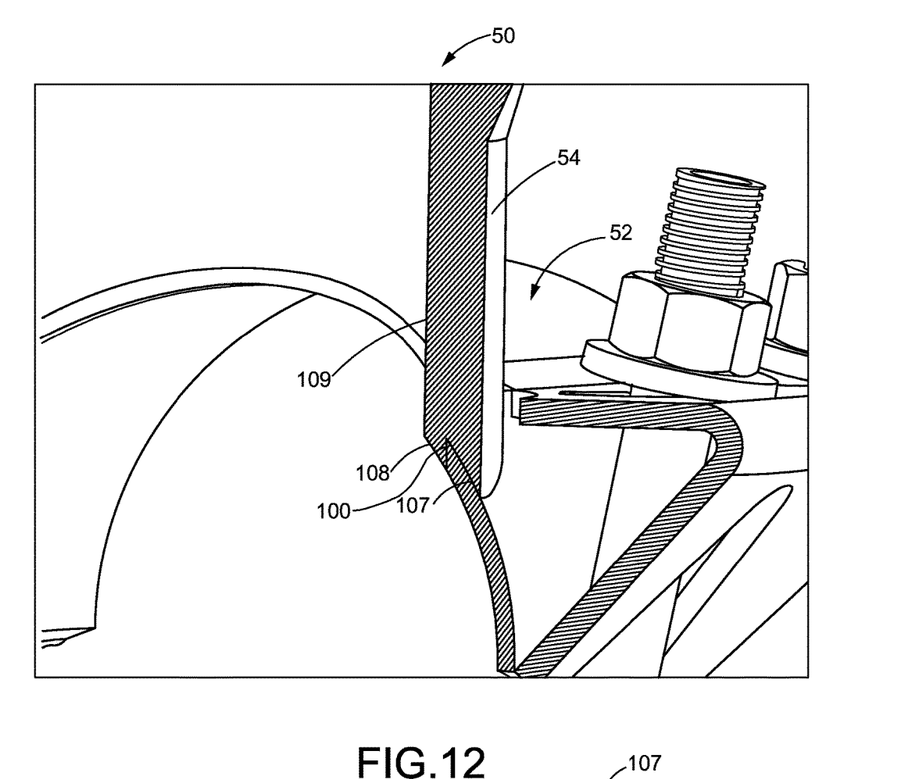
FIG. 12 is an enlarged partial view of the proximal edge of the nozzle that is welded to the upper saddle member, particularly illustrating the inner lip that inhibits seepage of welding material between the proximal edge of the nozzle and the upper saddle member.
Figure 13:
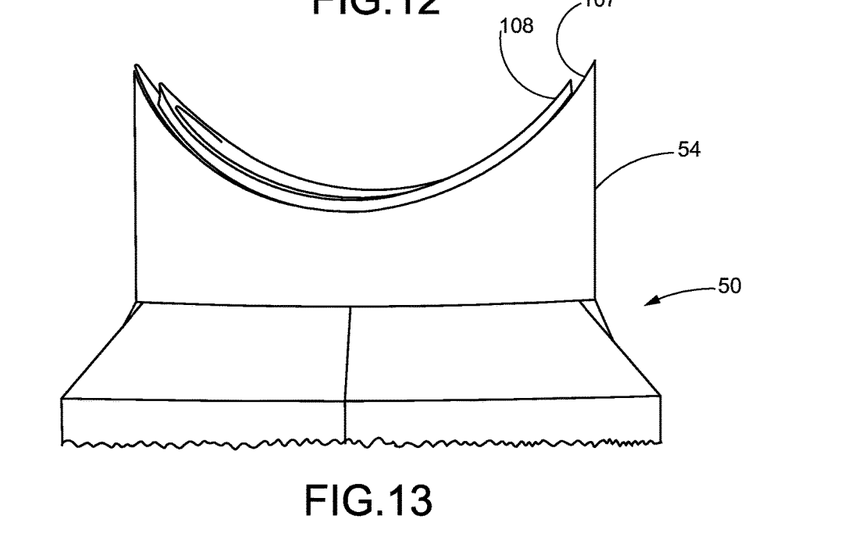
FIG. 13 is an enlarged perspective view of the proximal edge of the nozzle and inner lip.

FIG. 11 is a top plan view of a nozzle 50 that is cast with the flange 56, the clevis(es) 91 (see FIG. 8) and the inner lip 108 (FIGS. 12-13). The flange 56 may include a plurality of openings 101 for receiving pins shown at 102 in FIGS. 8-10. The pins 102 secure the completion plug 103 in place as shown in FIGS. 8-9. More specifically, the nozzle 50 may include a distal cavity 104 (FIG. 10) for receiving a completion plug 103 (FIGS. 8-9).

The nozzle 50 may include an open distal end 55, an open proximal end 54 with a through passage 105 extending therebetween as shown in FIG. 10. A distal portion of the passage 105 may feature a non-circular cross-sectional profile 110 and a proximal portion of the passage 105 may feature a circular cross-sectional profile 117. As shown in FIG. 11, the nozzle 50 may include a central axis 106. The non-circular cross-sectional profile 110 of the passage 105 as well as the circular cross-sectional profile 117 of the passage 105 can be seen from the top view shown in FIG. 11. In the embodiment shown in FIGS. 8-11, the non-circular cross-sectional profile 110 may be polygonal. More specifically, the non-circular cross-sectional profile 110 of the passage 105 may essentially be a pentagon with a truncated apex 113 as shown in FIG. 11. The truncated apex 113 may be used as an alignment tool to ensure that the gate valve 82 is installed in the correct orientation with respect to the axis 114 of the pipe 51 (FIG. 8).

Turning to FIGS. 12-13, the proximal end 54 of the nozzle 50 is shown in detail. The proximal end 54 terminates at a proximal edge 107. The proximal edge 107 is connected to an inner lip 108. The inner lip 108 is flush with an inner surface 109 of the passage 105. As shown in FIG. 12, the proximal edge 107 may be welded to the upper saddle member 52. More specifically, a hole cut into the upper saddle member 52. The inner lip 108 serves as a dam to prevent welding material from seeping between the hole 100 in the upper saddle member 52 and the proximal end 54 of the nozzle 50. The inner lip 108 facilitates this welding process and further enables the curvature of the upper saddle member 52 to vary as necessitated by different thickness dimensions of the pipe 51. For example, nozzles 50 are fabricated for different internal diameters (IDs) of pipes 51. If the pipe 51 has an ID of six inches, a single nozzle 50 may be cast for pipes 51 with a six-inch ID. However, six-inch ID pipes may have different thicknesses, due to different materials of construction, different pressure ratings, etc. and therefore the outside diameter (OD) of six-inch pipes may vary. The upper saddle members 52 and lower saddle members 86 are carefully fabricated to match the OD of the pipe 51. While a variety of upper saddle members 52 and lower saddle members 86 may be fabricated for six-inch ID pipes with varying ODs, to save costs, only a single nozzle 50 may be fabricated for all six-inch ID pipes. Thus, the geometry or curvature of the upper saddle member 52 will vary. The inner lip 108 facilitates the welding of the proximal end 54 of the nozzle 50 to the upper saddle member 52 and permits some variance in the geometry or curvature of the upper saddle member 52 without causing serious seepage of welding material between hole 100 in the the upper saddle member 52 and the inner lip 108 of the proximal end 54 of the nozzle 50.

Figure 14:
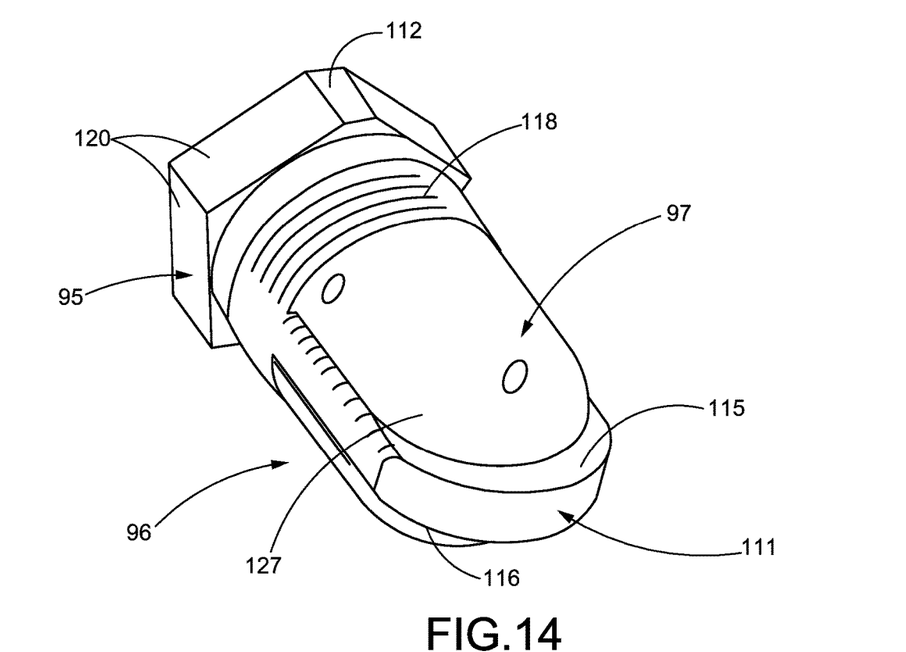
FIG. 14 is a perspective view of a disclosed gate valve including a cartridge, a paddle and a wiper seal.

Turning to FIGS. 14-19, a cartridge 96 is shown with a distal section 95 and a proximal section 97. As seen in FIG. 14, the distal section 95 has a non-circular cross-sectional profile 120 that matches the non-circular cross-sectional profile 110 of the passage 105 of the nozzle 50 (FIG. 10). Returning to FIG. 14, the proximal section 97 of the cartridge 96 has a generally circular cross-sectional profile 127 that matches the generally circular cross-sectional profile 117 of the passage 105 of the nozzle 50 (FIG. 10). As shown in FIG. 20, the non-circular cross-sectional profile 120 of the distal section 95 of the cartridge 96 and the non-circular cross-sectional profile 110 of the passage 105 of the nozzle 50 prevent any twisting of the cartridge 96 within the nozzle 50. Thus, once installed in the nozzle 50, the cartridge 96 cannot rotate due to the complimentary non-circular cross-sectional profiles 110, 120 of the distal section 95 of the cartridge 96 and the distal portion of the passage 105. As a result, any force exerted on the paddle 111 will not result in any twisting of the cartridge 96 within the nozzle 50.

Figure 15:
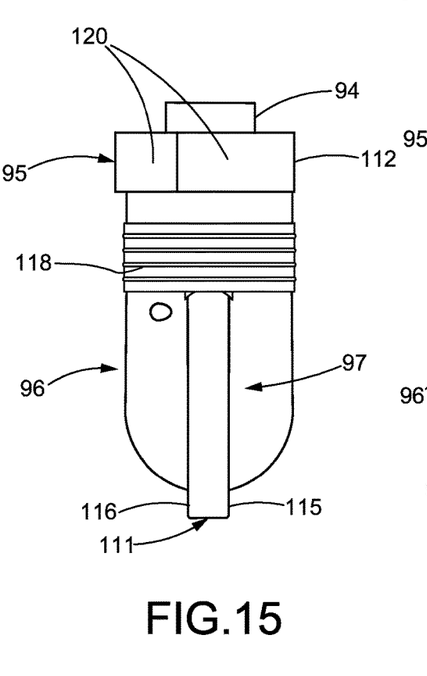
FIG. 15 is a side plan view of the gate valve shown in FIG. 14.
Figure 16:
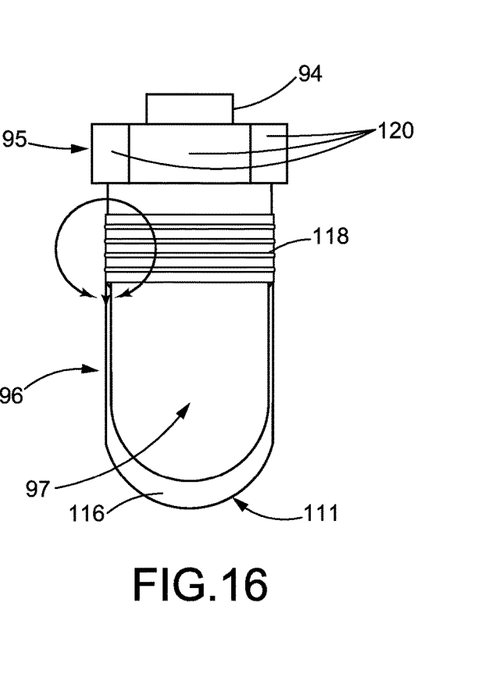
FIG. 16 is a front plan view of the gate valve shown in FIGS. 14-15.
Figures 17, 18, 19, 20:
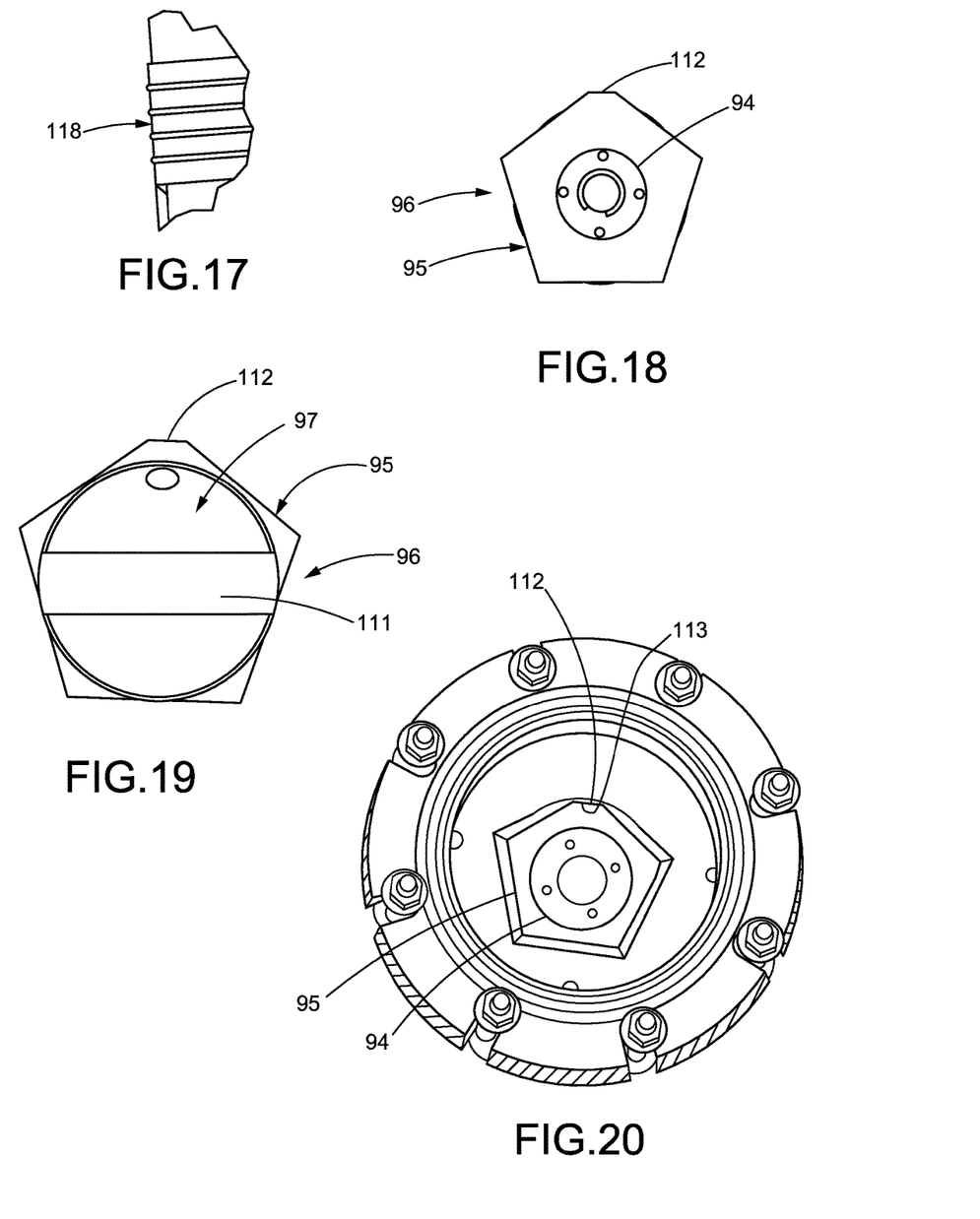
FIG. 17 is a partial enlarged view of the wiper seal shown in FIGS. 14-16.
FIG. 18 is a top plan view of the cartridge shown in FIGS. 14-17.
FIG. 19 is a bottom plan view of the cartridge and paddle shown in FIGS. 14-16.
FIG. 20 is a partial top plan view of the gate valve disposed within the nozzle as shown in FIG. 8.

Further, to make the installation "fool proof," the distal section 95 of the cartridge 96 features a truncated apex 112 (FIGS. 18-19). The truncated apex 112 of the distal section 95 of the cartridge 96 compliments the similar truncated apex 113 of the non-circular cross-sectional profile 110 as shown in FIGS. 11 and 20. Typically, the truncated apexes 112, 113 may be disposed perpendicular to the central axis 114 of the pipe 51 (FIG. 8). In other words, in the configuration shown in FIG. 14, the truncated apex 112 of the cartridge 96 is essentially parallel to the side 115 of the paddle 111 or parallel to both opposing sides 115, 116 of the paddle 111 as shown in FIGS. 15-16. Other geometric shapes may be incorporated into the passage 105 and cartridge 96 to prevent rotation of the cartridge 96 within the nozzle 50, as will be apparent to those skilled in the art.

As shown in FIG. 14, the circular cross-sectional profile 127 provided by the proximal section 97 of the cartridge 96 enables the proximal section of the cartridge 97 to accommodate a wiper seal 118, which is shown in greater detail in FIG. 17. The wiper seal 118 provides a sealing engagement between the cartridge 96 and the circular cross-sectional profile 117 of the passage 105 of the nozzle 50 once the cartridge 96 or gate valve 82 has been moved to the closed position. Details of the wiper seal 118 are illustrated in FIG. 17. The position of the upper seal 118 near the distal section 95 of the cartridge 96 ensures that the upper seal 118 is not damaged by the hole 100 in the upper saddle member 52 or the hole in the pipe 51.

INDUSTRIAL APPLICABILITY

Investment castings are used instead of weldments for the manufacture of the nozzles 50 of disclosed gate valve assemblies. Use of investment castings for the nozzles 50 increases the pressure ratings of the nozzles 50. Further, casting enables various features to be incorporated into the nozzles 50 that could not be utilized before, such as devises 91 for attaching chains or ropes for raising and lowering the nozzles 50. The disclosed designs address at least two failure modes: 1) compression and tearing of the upper seal along the pipe-cut and 2) elimination of alignment keys or slots on the bullet or cartridge 96 and elimination of alignment keys or slots inside the nozzle 50.

To solve the alignment problem and eliminate the use of keys and slots, complimentary geometric shapes or non-circular cross-sectional profiles 110, 120 have been integrated into the passage 105 and the cartridge 96 respectively. The purpose of these non-circular cross-sectional profiles 110, 120 is to inhibit rotation or twisting of the cartridge 96 within the nozzle 50 or about the central axis 106 of the nozzle 50. The geometric shapes or non-circular cross-sectional profiles 110, 120 may be chosen to facilitate proper alignment of the paddle 111 perpendicular to the flow water through the pipe 51.

Further, by casting the nozzles 50, the proximal ends 54 of the nozzles 50 may include an inner, downwardly extending lip 108 for insertion into the hole 100 cut into the upper saddle member 52. The lip 108 allows a single nozzle 50 to be utilized with numerous saddle assemblies or upper saddle members 52 designed for pipes 51 having varying thicknesses and therefore varying ODs. Further, the upper seal on the cartridge 96 has been replaced with a horizontal wiper seal 118, which seals against the passage 105 of the nozzle 50 at its proximal end 54, above the pipe cut. Because the wiper seal 118 does not pass through the pipe cut or the hole 100 in the upper saddle member 52, there is less wear and tear on the wiper seal 118 and therefore the disclosed valve assemblies will fail less often and will last longer.

While only certain embodiments have been set forth, alternatives and modifications will be apparent from the above description to those skilled in the art. These and other alternatives are considered equivalents and within the spirit and scope of this disclosure.

The invention claimed is:

1. A gate valve assembly for perpendicular mounting to a cylindrical pipe, the gate valve assembly comprising:
    a nozzle including an open distal end and an open proximal end with a through passage extending from the distal end to the proximal end, the proximal end perpendicularly connected to a upper saddle member, the upper saddle member coupled to a lower saddle member for clamping the cylindrical pipe therebetween,
    the passage further including a distal portion having a first non-circular cross-sectional profile that extends from the distal portion to a proximal portion having a first circular cross-sectional profile,
    a gate valve comprising a cartridge and a paddle, the cartridge including a distal section connected to a proximal section, the distal section of the cartridge having a second non-circular cross-sectional profile that is mateably and slidably received in the first non-circular cross-sectional profile of the passage of the nozzle, the first and second non-circular profiles blocking rotation of the cartridge when the distal section of the cartridge is received in the passage, at least part of the proximal section of the cartridge having a second circular cross-sectional profile that is mateably received in the first circular cross-sectional profile of the passage, the proximal section of the cartridge further including a rounded proximal end,
    the proximal section of the cartridge including a paddle recess that extends along diametrically opposite portions of the proximal section and diametrically across the rounded proximal end of the cartridge, the paddle recess accommodating the paddle,
    the first and second non-circular cross-sectional profiles orienting the paddle recess and the paddle in a perpendicular relationship to the cylindrical pipe.

2. The gate valve assembly of claim 1 wherein the first and second non-circular cross-sectional profiles each include a truncated apex that is oriented perpendicular to the cylindrical pipe.

3. The gate valve assembly of claim 1 wherein the first and second non-circular cross-sectional profiles each include a plurality of apexes and a truncated apex, the truncated apexes being generally perpendicular to the cylindrical pipe.

4. The gate valve assembly of claim 2 wherein the paddle includes an outer edge that extends beyond the proximal section of the cartridge and the paddle includes opposite sides disposed primarily within the paddle recess,
    the truncated apexes of the first and second non-circular cross-sectional profiles being generally parallel to the opposite sides of the paddle.

5. The gate valve assembly of claim 2 wherein the upper saddle member extends along a first saddle axis, the first saddle axis being generally perpendicular to the truncated apexes.

6. The gate valve assembly of claim 1 wherein said part of the proximal section of the cartridge that includes the second circular cross-sectional profile further includes a wiper seal recess that encircles said art of proximal section of the cartridge that includes the second circular cross-sectional profile, the wiper seal recess accommodating a circular wiper seal, the circular wiper seal sealably and slidably engaging the first circular cross-sectional profile of the passage of the nozzle thereby isolating the distal portion of the passage of the cartridge from the cylindrical pipe regardless of the position of the wiper seal in the proximal portion of the nozzle with the first circular cross-sectional profile.

7. The gate valve assembly of claim 1 wherein the distal end of the nozzle is connected to a flange, the flange is connected to at least one clevis.

8. The gate valve assembly of claim 1 wherein the open proximal end of the nozzle includes a continuous edge welded to the upper saddle member, the continuous edge connected to an inner lip that is flush with an inner surface of the proximal section the nozzle, the inner lip extending proximally outward from the continuous edge.

9. The gate valve assembly of claim 1 wherein the paddle recess and the paddle are generally U-shaped.

10. A gate valve assembly for perpendicular mounting to a cylindrical pipe, the gate valve assembly comprising:
- a nozzle including an open distal end and an open proximal end with a through passage extending from the distal end to the proximal end, the proximal end perpendicularly connected to a upper saddle member, the upper saddle member coupled to a lower saddle member for clamping the cylindrical pipe therebetween,
- the through passage of the nozzle including a distal portion and a proximal portion, the distal portion having a first polygonal cross-sectional profile that extends from the distal portion to the proximal portion, the proximal portion of the through passage having a first circular cross-sectional profile,
- a gate valve comprising a cartridge and a paddle, the cartridge including a distal section connected to a proximal section, the distal section of the cartridge having a second polygonal profile that is mateably and slidably received in the first non-circular cross-sectional profile of the nozzle, the gate valve prevented from axial rotation when the second polygonal profile is mateably received M the nozzle, at least part of the proximal section of the cartridge having a second circular cross-sectional profile that is slidably received in the first circular cross-sectional profile, the proximal section of the cartridge further including a rounded proximal end,
- the proximal section of the cartridge including a paddle recess that accommodates a paddle,
- the first and second polygonal profiles configured so the paddle recess and the paddle must be oriented perpendicular to the cylindrical pipe.

11. The gate valve assembly of claim 10 wherein the paddle recess is generally U-shaped and extends along diametrically opposite portions of the proximal section of the cartridge and diametrically across the rounded proximal end of the cartridge, the paddle also being generally U-shaped.

12. The gate valve assembly of claim 10 wherein the first and second polygonal profiles each include a truncated apex,
- the paddle includes an outer edge that extends beyond the proximal section of the cartridge and the paddle includes opposite sides disposed primarily within the paddle recess,
- the truncated apexes of the first and second non-circular cross-sectional profiles being generally parallel to the opposite sides of the paddle.

13. The gate valve assembly of claim 10 wherein the distal end of the nozzle is connected to a flange, the flange is connected to at least one clevis.

14. The gate valve assembly of claim 10 wherein the open proximal end of the nozzle includes a continuous edge welded to the upper saddle member, the continuous edge connected to an inner lip that is flush with an inner surface of the proximal section the nozzle, the inner lip extending proximally outward from the continuous edge.

15. The gate valve assembly of claim 10 wherein said part of the proximal section of the cartridge that includes the second circular cross-sectional profile further includes a wiper seal recess that encircles said part of proximal section of the cartridge that includes the second circular cross-sectional profile, the wiper seal recess accommodating a circular wiper seal, the circular wiper seal sealably and slidably engaging the first circular cross-sectional profile of the passage of the nozzle thereby isolating the distal portion of the passage of the nozzle from the cylindrical pipe regardless of the position of the wiper seal in the proximal portion of the nozzle with the first circular cross-sectional profile.

* * * * *

UNITED STATES PATENT AND TRADEMARK OFFICE
CERTIFICATE OF CORRECTION

| | |
|---|---|
| PATENT NO. | : 9,644,779 B2 |
| APPLICATION NO. | : 14/586469 |
| DATED | : May 9, 2017 |
| INVENTOR(S) | : Vazzana et al. |

It is certified that error appears in the above-identified patent and that said Letters Patent is hereby corrected as shown below:

In the Claims

Column 11, Line 27, delete the word "M" and substitute therefore --in--.

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*